Dec. 18, 1956 C. A. KELLEY ET AL 2,774,303
LOCKING DEVICE FOR LINE SLUGS
Filed Aug. 17, 1954 2 Sheets-Sheet 1

Clarence A. Kelley
Jerome S. Jervan
INVENTORS,

Dec. 18, 1956
C. A. KELLEY ET AL
2,774,303
LOCKING DEVICE FOR LINE SLUGS
Filed Aug. 17, 1954.
2 Sheets-Sheet 2
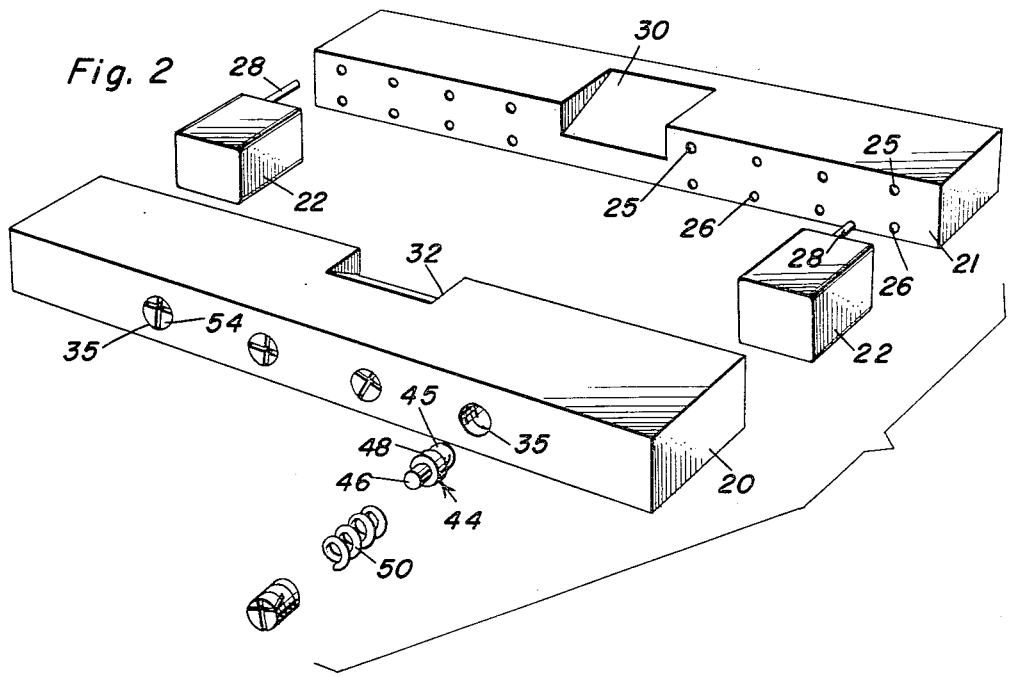
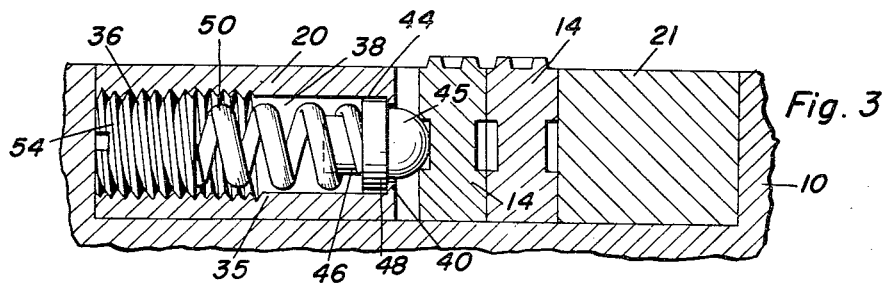
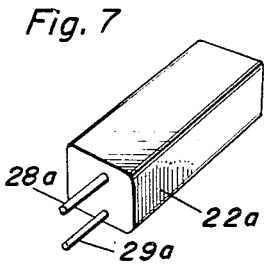
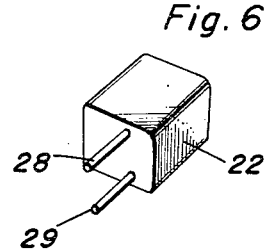
Clarence A. Kelley
Jerome S. Jervan
INVENTORS

United States Patent Office 2,774,303
Patented Dec. 18, 1956

2,774,303

LOCKING DEVICE FOR LINE SLUGS

Clarence A. Kelley, Lake Villa, and Jerome S. Jervan, Waukegan, Ill.

Application August 17, 1954, Serial No. 450,451

5 Claims. (Cl. 101—392)

This invention relates to printing forms and it has for its main object to provide special gripping and locking means adapted to be held in a printer's chase for gripping and holding Linotype or other line slugs, which means permits the locking and holding of a considerable number of line slugs of any length on any standard type of chase.

A further main object of the invention consists in providing a gripping and locking means of the type above mentioned which holds the line slugs in such a manner that they can be exchanged without any necessity for planing, making-ready or other preliminary operations, which exchange of slugs can therefore be carried out without removal of the chase from the press.

A further object of the invention consists in providing a slug gripping and locking means which consists entirely of separable parts which may be joined and adjusted relatively to each other in such a manner that the device may grip and hold any number of slugs and slugs of many lengths.

As a rule, operation of printing forms for work made up from or containing type bars or line slugs, such as the well known "Linotype" slugs, is attended with considerable difficulty, involving slow and rather painstaking work. To hold slugs and other matter in a required position chases are sometimes provided with spring pressed slides or the like which grips the slugs. In other cases slugs are held by longitudinal or transverse bars or they are merely held by furniture and quoins. In all these cases even if the quadding and centering mechanism of the commercial Linotype machine is used to produce slugs which are quadded at either or on both ends of the type line, the work in placing the slugs is considerable. The chase has to be removed from the press and the change is attended by somewhat tedious work, sometimes resulting even in the crushing of wooden furniture and in the moving of type off their feet during the locking operation.

The invention consists in a special locking frame for the line slugs which is composed of easily separable parts which remain in their place when the slugs are removed and are replaced by the same number of line slugs. This locking frame may be held in the chase by any means, but need only be held by furniture, quoins etc., or it may be held by movable slides or bars if the chase is provided with such means. The furniture, quoins, type etc. held within the printing chase and holding the locking frame are not disturbed when the line slugs are removed from the special locking frame and all the elements of the said locking frame remain in their place during such removal and the insertion of new slugs. The special locking frame for the slugs is moreover provided with means for gripping the slugs which are sufficiently resilient to permit removal of a group of slugs and the insertion of another group of line slugs, which means that gripping of all the slugs which have been inserted into the special locking frame is possible without any preparatory work to be performed.

A special feature involving the slug locking means according to the invention consists in its adaptability which permits the adjustment of its dimensions to any number of slugs and to any length of slugs.

A further special feature of the locking frame according to the invention consists in the adjustability of the gripping means which permits convenient adjustment of the pressure exercised by the gripping means by the operator.

Further more specific features will be apparent from the following detailed specification.

The invention is illustrated in the accompanying drawings showing one embodiment thereof. It is however to be understood that the invention is illustrated by way of example only and that the embodiment shown has been selected in order to be able to explain the principle of the invention and the best mode of applying said principle. Other modes of applying the principle may be selected and departure from the embodiment which has been illustrated in the drawings is therefore not necessarily a departure from the principle of the invention.

In the drawings:

Figure 2 is an exploded perspective view of the gripping and holding frame for the line slugs.

Figure 3 is a sectional elevational view through the locking frame, the section being taken along the line 3—3 of Figure 1.

Figures 6 and 7 are perspective views of spacers or side pieces of varying length permitting the adaptation of the locking frame to different numbers of inserted slugs.

Figure 1:
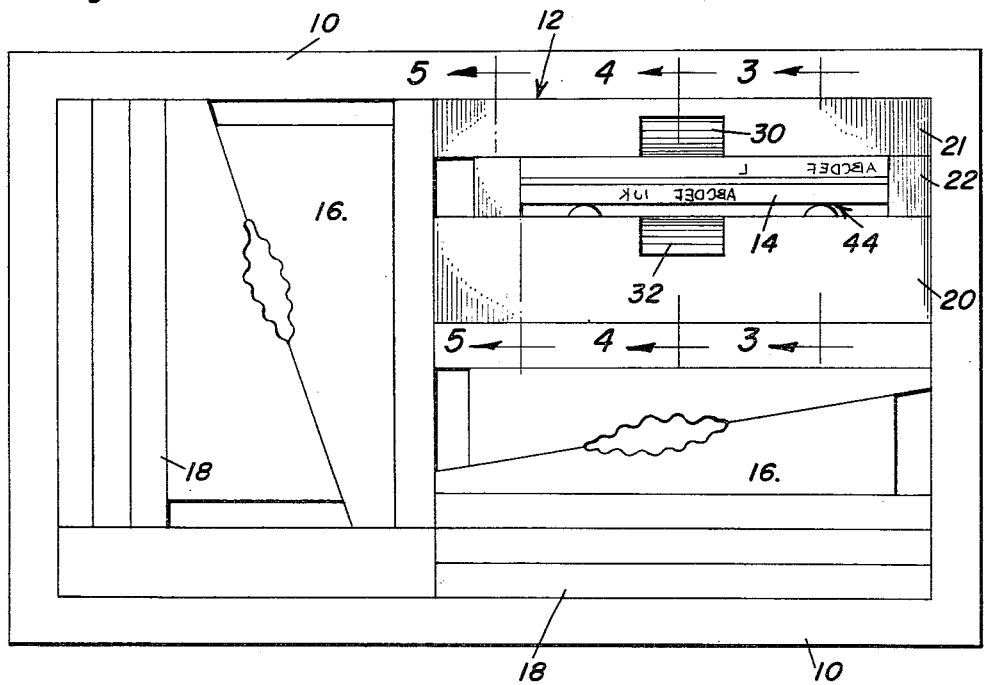
Figure 1 is a plan view of a printing chase within which a special line slug holding and gripping frame is held by furniture and quoins.

In the drawing Figure 1 shows a printer's chase 10 of standard type with printing forms locked therein. The printing forms may be of any kind or type, but among them is the slug holding and locking frame 12 which holds and locks a number of Linotype slugs 14. Other printing forms may be of any character, for instance may be type fixed in the chase, or the group of slugs 14 may be the sole form fixed in the chase and may be held there by the customary quoins 16 and furniture 18.

For a better understanding of the invention it may be mentioned that many printing jobs require that a certain grouping of slugs, including a definite number of such slugs, should be held within the chase, which group of slugs however should be exchangeable while the number of slugs itself and the location of the printing form within the chase which includes said exchangeable slugs does not change while this particular job is performed.

On the other hand different printing jobs may require a quite different grouping with a different number of slugs.

Examples of such printing jobs are, for instance, the printing of return addresses, the printing of greeting cards provided with signatures, the printing of doctors' prescriptions and the like in which the address or signature changes very frequently during the job as each name and address or signature is only printed on a small number of copies, the remainder of the type however being always the same.

It will thus be seen that a great adaptability is necessary to allow different groupings of Linotype slugs, but once a definite group has been selected the exchange of slugs within the grouping must be possible with a minimum of effort and time.

According to the invention, therefore, a special locking holding and gripping frame 12 is provided which fulfills the above mentioned conditions. This frame consists of a pressure bar 20 and a backing bar 21, both of appropriate length, somewhat exceeding the length of the longest Linotype slug which is to be used. Between these two bars 20 and 21, the Linotype slugs are inserted and held. These two bars are held at a suitable distance by spacer blocks 22 described below. The two bars and the spacers form a locking frame for the Linotype slugs 14. The bars and spacers may be made of aluminum or of any other light but very strong material, such as plastic compounds.

The backing bar 21 is of rectangular cross-section and is provided with a set of bores or holes which are arranged in pairs 25, 26. Each pair, 25, 26, being spaced in a vertical direction when the chase is in a horizontal position, the pairs 25, 26 being spaced along the backing bar in a longitudinal direction. These bores or holes 25, 26 receive pins 28, 29 which project from the spacer blocks 22, thus permitting to fix the position of the spacer blocks on the backing bar. The spacers are merely prismatic blocks preferably with rounded or beveled edges from which the pins 28, 29 project on one side.

As seen in Figures 6 and 7 a number of different spacer blocks 22, 22a of different lengths l are provided, to be used alternatively in connection with the backing bar and pressure bar. The length of the spacer blocks 22 is so selected that this length corresponds to different groupings of Linotype bars or slugs which contain a different number of slugs, such grouping being used in connection with the different printing jobs. For instance, spacers for 2, 3, 4 . . . Linotype slugs are provided, to be used in accordance with the number of Linotype slugs within a grouping which is to be accommodated within the locking frame.

Each of these spacers is provided with a pair of identical pins (28, 29 in Figure 6, 28a, 29a in Figure 7) fitting into the bores or holes 25, 26.

The pins may be arranged in a plane which is off center with respect to the parallel plane of symmetry of the block and which permits to adjust the distance between the inner faces of the spacer blocks and the two sides of the backing bar to an extent which is smaller than the distance between the pairs of bores or holes 25, 26.

Preferably the distance between the pairs of holes or bores is measured in a typographical standard measure (such as picas). The distance between the bores or holes is a multiple of a typographical unit. By setting the pins one-half typographical unit off center, for instance, a variation of the distance between spacers amounting to one unit (pica) may be obtained with a number of holes or bores which are so spaced that they are three typographical units apart.

In the center portion of the backing bar 21 a finger recess 30 provides finger clearance which enables the operator to seize the Linotype slugs which are seated in the locking frame as described below.

The pressure bar 20 is provided with a number of suitably spaced bores 35 which pierce the bar 20 in a transverse direction and which bores comprise a threaded portion 36 and a smooth portion 38, the latter having a shoulder 40 near the end of the smooth bore on the inner side of the pressure bar 20. Into each of these bores pressure pins 44 are inserted which project from the inner side of the bar 20. These pressure pins 44 have a semi-spherical head 45 and a cylindrical body 46 with a collar 48 of a larger diameter than the sphere and the cylindrical body between them. This collar 48 fits more or less completely into the smooth portion 38 of the bore and abuts against the shoulder 40 at the inner end of the bore when pressed toward said end, the shoulder 40 thus forming the limiting stop for the pin 44. The pressure pin 44 is pressed outwardly by a compression spring 50 inserted into the bore 35 which is urged toward the pressure pin 44 by a stopper 54 preferably formed by a self locking tension screw which is inserted into and engages the threaded portion 36 of the bore 35. The tension screw 54 permits to adjust the tension of the spring 50, its length being preferably so chosen that its outer face is either flush with the outer face of the pressure bar 20 or is located within the bore 35.

Approximately in the middle of the inner side of the pressure bar a finger recess 32 is formed by beveling the edge along a certain distance, producing an inclined surface which clears the uppermost portion of the Linotype slugs when inserted between the pressure bar and the backing bar. The two finger recesses 30 and 32 therefore permit the operator to seize the upper portion of the Linotype slugs approximately in the center and to lift and remove them.

In operation, as will be seen from Figures 1, 2 and 3, a suitable spacer block is selected for a particular job to be performed whose length corresponds to the number of Linotype slugs to be aligned within the locking frame for this particular printing job. The Linotype slugs are usually measured in typographical units (normally picas) and in accordance with the known length of the slugs the spacers are inserted with their pins 28, 29 into the holes which correspond to the length. They are inserted in the position which makes the space between the two spacers correspond to the length of the slugs after the locking frame, consisting of the backing bar 21 to which the spacers 22 have been fixed and the pressure bar 20 which is applied against the spacers has been assembled and is placed into the chase which may or may not be provided with other printing forms and which is held in its position by means of quoins 16 and the furniture 18 filling the chase 10 as far as not occupied by other printing forms.

Figure 4:
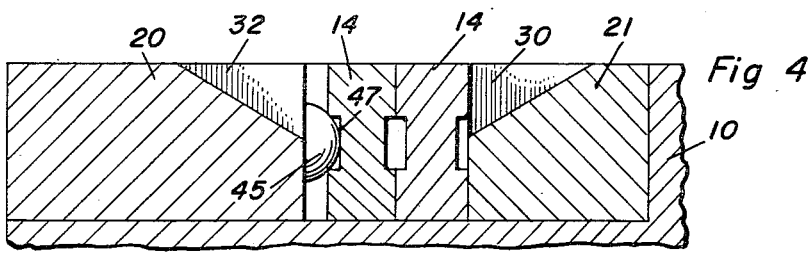
Figure 4 is an elevational sectional view through the locking frame, the section being taken along the line 4—4 of Figure 1.
Figure 5:
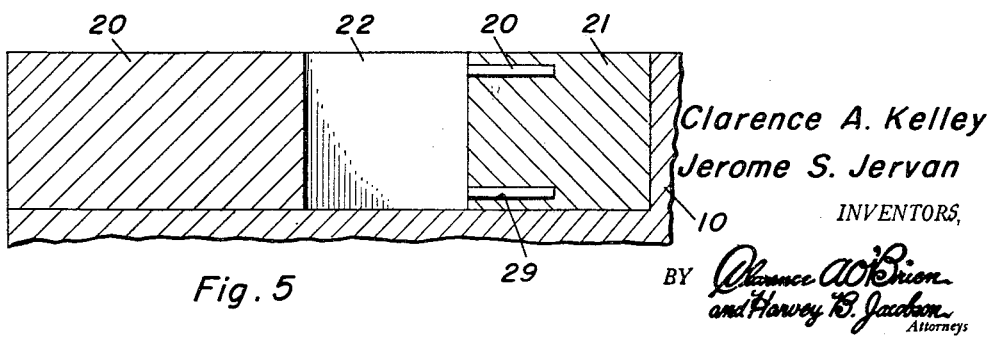
Figure 5 is a sectional elevational view of the locking frame, the section being taken along the line indicated at 5—5 in Figure 1.

The Linotype slugs required for the first part of the printing job are now inserted into the locking frame 12 pressing back the heads 45 of the pressure pins 44 which, as seen in Figure 4, snap into the grooved portion 47 of the Linotype slug 14 thus holding the Linotype slugs firmly and pressing them against the backing bar while simultaneously also holding them against dropping out in the case that the chase is moved.

Whenever necessary, the operator, using the finger clearance 30, 32 may however, without any difficulty and without removing the locking frame from the press or disturbing the forms held by the chase and while the chase is on the printing press, remove the Linotype slugs which are held by the pressure pins and replace them by an equal number of other slugs. The printing press, during this operation, must only be stopped momentarily and, immediately after the exchange the printing press operation may continue so that it is possible, for instance, to print circulars, envelopes, cards or the like with many different addresses or signatures, each address or signature appearing only on a small number of copies without any appreciable loss of time and expenditure of care and effort.

It will also be clear that when using the conventional quadding and centering device of the commercial Linotype machine the Linotype slugs will always be exactly centered in the space of the locking frame 12 in which the slugs are located. It will also be understood that if a printing job requires for instance, the use of two Linotype slugs for part of the job and of three Linotype slugs for another part of the job this can easily be handled by virtue of the adaptability of the frame, which is prepared in this case for three Linotype slugs, and when ever only two are used they may be used together with another slug showing only blank or quaded portions.

It will thus be seen that the special locking frame according to the invention greatly simplifies a number of printing jobs by eliminating completely the need for removal of the chase from the printing press in order to change Linotype slugs, the interruption in the operation of the press being only momentary as the exchange operation lasts only a few seconds. This method eliminates completely the planing or making-ready or other preliminary work connected with such exchange.

The locking frame, consisting of easily removable and exchangeable parts is of great adaptability and thereby usable for a great variety of printing jobs as it can be made to hold any number of slugs and can be adjusted for any length of the Linotype slugs without any painstaking and lengthy special preliminary work. Once the locking frame has been assembled and is held in the chase, removal of Linotype slugs for the purpose of exchange and the insertion of new slugs is a simple and instantaneously performed manual operation.

The tension with which the Linotype slugs are gripped may be adjusted by adjusting the spring tension applied to the pressure pins 44, thus regulating the pressure with which the Lniotype slugs are held. This tension which is adjustable by means of the tension screws can therefore be adjusted to the optimum value which will be sufficient to grip them firmly while on the other hand, not offering a disproportionate resistance against removal of the slugs.

Obviously, the locking frame can be used in connection with any standard type of chase.

The invention has been described in connection with some definite embodiment thereof, but it will be clear that minor and unessential changes may be made without in any way departing from the essence of the invention as defined in the annexed claims.

What is claimed as new is as follows:

1. A printing form holder for holding a group of line slugs within a printer's chase, comprising a holding and locking frame for said slugs, consisting of a backing bar provided with spaced attaching means, exchangeable spacer blocks, selected from a group of blocks of varying lengths and provided with means for detachably attaching them to the attaching means of the backing bar, two of said spacer blocks the length of which corresponds to the number of line slugs to be held, being attached to the backing bar in positions so spaced on the said backing bar that the distance at which they are attached corresponds to the length of the line slugs, a pressure bar applied against said spacer blocks, chase filling elements within the printer's chase applying pressure against the pressure bar, said pressure bar carrying spring pressed pressure pins, projecting from said pressure bar, the line slugs after insertion into the space between the spacer blocks and the backing and pressure bars, being resiliently held in one direction between the backing bar and the pressure bar by the spring pressed pressure pins projecting from the pressure bar while the slugs are laterally held against longitudinal displacement by the spacer blocks held on the backing bar.

2. A printing form holder as claimed in claim 1, wherein the means for detachably attaching the spacer blocks to the backing bar include pins projecting from the spacer blocks, inserted into and held by corresponding bores provided in the backing bar.

3. A printing form holder as claimed in claim 1 wherein the backing bar is provided with a series of spaced bores, while the spacer blocks are provided with projecting pins frictionally fitting into the said bores of the backing bar, the distance between the spacer blocks, which corresponds to that of the line slugs length, being adjusted by insertion of the pins projecting from the spacer blocks into bores spaced a corresponding distance apart.

4. A printing form holder as claimed in claim 1, wherein the backing bar is provided with a series of pairs of spaced bores, the pairs being spaced longitudinally along the backing bar and the bores of a pair being spaced at right angles to the longitudinal spacing of the series, each spacer block being provided with a pair of pins projecting from said block, adapted to be inserted into and fixedly held by a pair of bores, the spacer block pins being inserted into bores the spacing of which is so selected, that the inner sides of said spacer blocks facing each other are located at a distance corresponding to the length of a line slug.

5. A printing form holder as claimed in claim 4 wherein the pair of pins projecting from the spacer blocks are arranged in a plane which is eccentric with respect to the parallel plane of symmetry of the spacer block to provide a number of different spacings of the spacer blocks, larger than the number of pairs of bores in the backing bar.

References Cited in the file of this patent

UNITED STATES PATENTS

| 503,251 | Osborne | Aug. 15, 1893 |
| 670,718 | Mearkle | Mar. 26, 1901 |
| 778,341 | Swain | Dec. 27, 1904 |
| 980,012 | Schmitz | Dec. 27, 1910 |
| 1,124,104 | Borgersen | Jan. 5, 1915 |
| 1,395,328 | Adams | Nov. 1, 1921 |
| 1,438,717 | Osterlind | Dec. 12, 1922 |
| 1,734,067 | Wood | Nov. 5, 1929 |
| 1,803,782 | Weldon | May 5, 1931 |
| 1,854,215 | Mueller | Apr. 19, 1932 |
| 2,173,025 | Parker | Sept. 12, 1939 |